May 31, 1966  E. A. EBERT  3,253,337
LINE DEPTH INDICATING DEVICE
Original Filed May 19, 1960  2 Sheets-Sheet 1
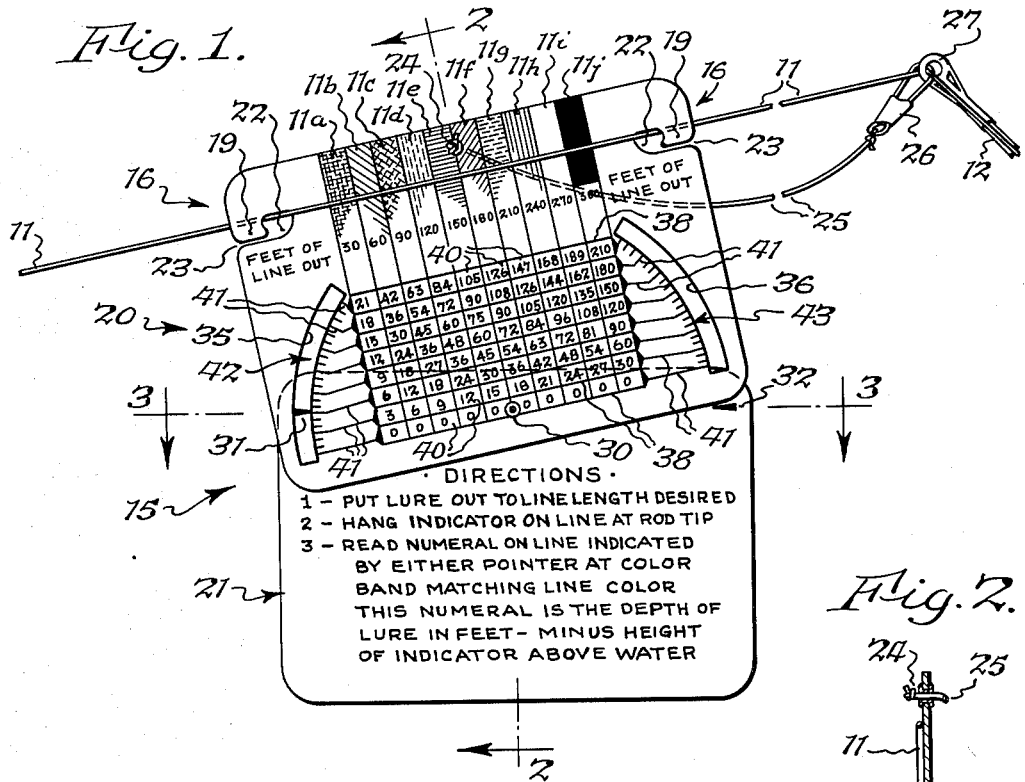
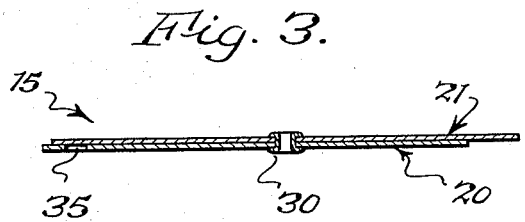
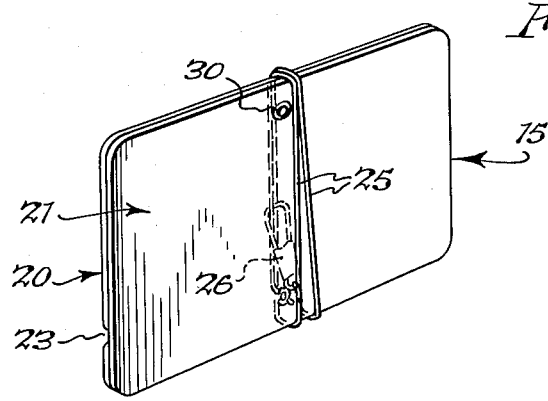
INVENTOR.
Edward A. Ebert May 31, 1966  E. A. EBERT  3,253,337
LINE DEPTH INDICATING DEVICE
Original Filed May 19, 1960  2 Sheets-Sheet 2
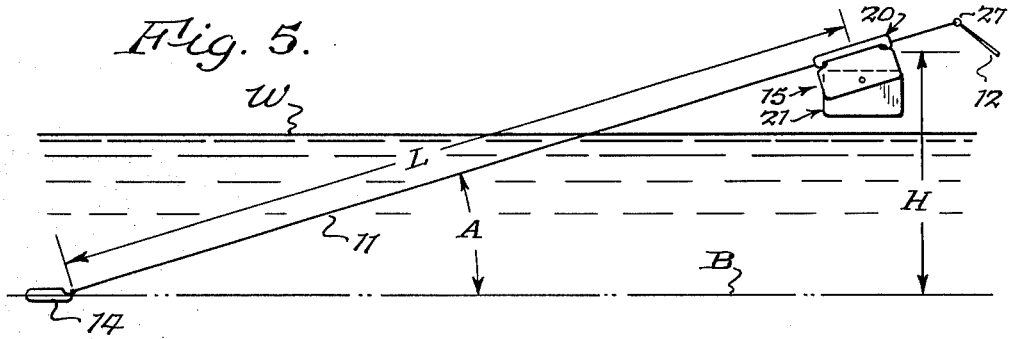
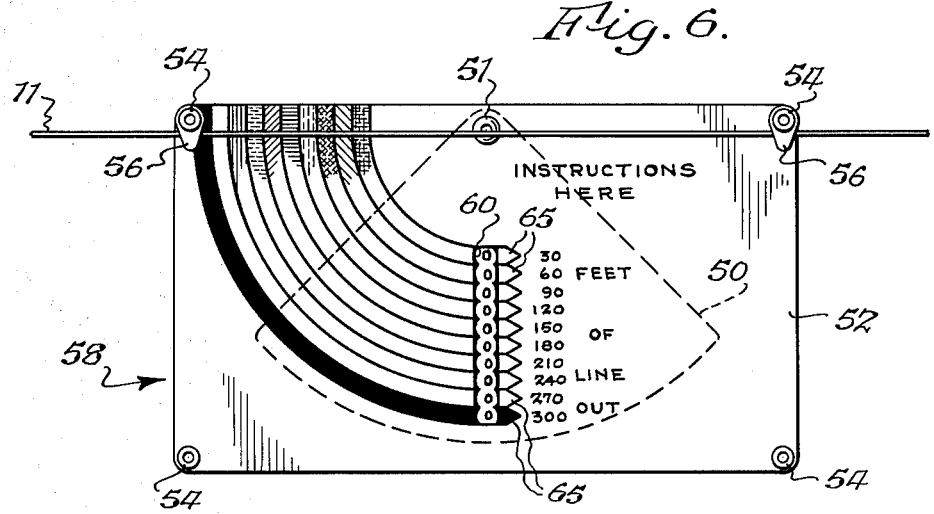
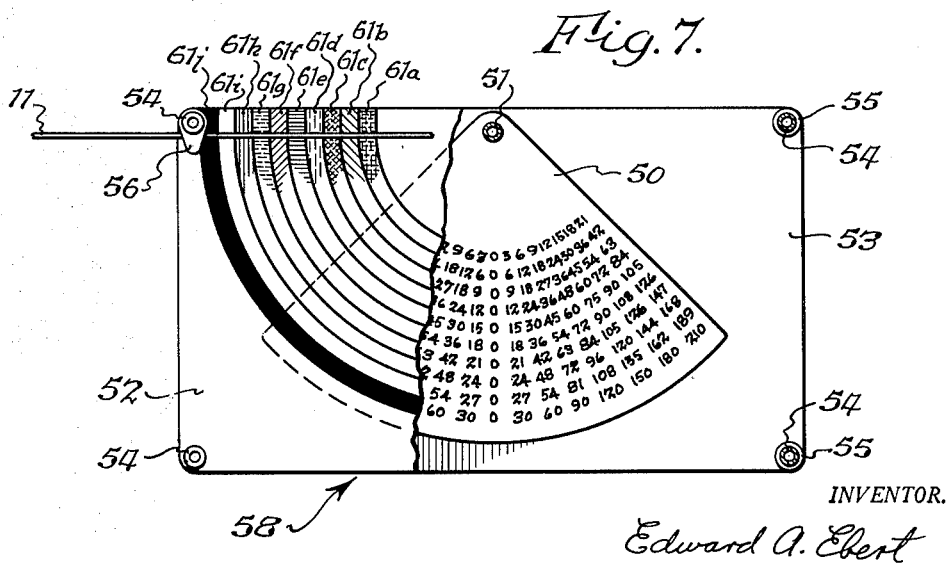
INVENTOR.
Edward A. Ebert United States Patent Office 3,253,337
Patented May 31, 1966

3,253,337
LINE DEPTH INDICATING DEVICE
Edward A. Ebert, 203 Huxley Drive, Snyder 26, N.Y.
Continuation of abandoned application Ser. No. 30,231,
May 19, 1960. This application Oct. 30, 1963, Ser.
No. 320,995
4 Claims. (Cl. 33—126)

This invention relates to a depth indicating device to be used in conjunction with a marked or measured line used, for example, while trolling a fish lure. This invention is a continuation on that disclosed in my application of Edward A. Ebert, Ser. No. 30,231, filed May 19, 1960, now abandoned.

The inveterate fisherman finds it to his advantage to know how deep he is trolling his lure over a given fishing spot to be consistently successful in his sport. Through constant practice over a long period of time experience may be gained which brings him consistent success, but if he actually could know the depth of his lure at all times, it would take the guess work out of his fishing and bring him success in a much shorter time.

To help the fisherman in this direction, i.e., give him more accurate facts, line manufacturers have produced marked lines such, for example, as a line having dyed sections of different colors, each colored section being of a given length. Some lines can be purchased having all colored sections of ten foot lengths, while others have twenty or thirty foot colored lengths. These lines usually are made in total lengths for fresh water use of three hundred feet.

Lines of this type only tell the distance that a lure is trailing out behind the boat and of course the depth of the lure might be deep or shallow, depending on the length of line out, the speed of the lure being trolled, the direction and speed of the winds and tides, the buoyancy of the lure and line, the water resistance of the lure, etc. With so many variable factors involved, it is all but impossible to guess with any degree of accuracy the actual depth of the lure.

However, the resulting angle of the trolling line in relation to a horizontal plane can be availed of to reveal the depth of the lure at the end of the line through the use of the principle of triangulation. This invention makes use of the above principle in calculating the depth figures indicated thereon.

One of the main objects of this invention is the provision of a direct reading indicator which is capable of continuously indicating the depth of a lure being trolled at the end of a fishing line by integration of the line length and angle to the horizontal factors.

Another object is to provide an accurate and compact device able to give a depth or height reading when used with a marked line or with a line of a measured length.

Another object is to provide an indicator with adjacent colored zones matching the colored sections of the line used to arrive at the correct reading of the depth of the line being trolled.

A further object is to provide an indicator which at a glance shows in printed figures the amount of line out.

A still further object is to provide an indicator which is neither of right nor left "hand," that will automatically give a correct reading when used in either a left or right hand position.

Another object is to provide an indicator having two similar sized parts, hinged so that when not in use it may be folded into one-half its extended size for compact storage.

Other objects, advantages and capabilities of the invention will appear from the following description and drawings of several embodiments thereof in which:

FIG. 1 is a side elevation of the depth indicator in use mounted on a trolling line.

FIG. 2 is a vertical, sectional view taken along the line 2—2, FIG. 1.

FIG. 3 is a horizontal, sectional view taken along the line 3—3, FIG. 1.

FIG. 4 is a perspective of the indicator folded compactly and looking at the rear side.

FIG. 5 is a diagram of the triangulation principle used by the invention.

FIG. 6 is a modified form of the invention.

FIG. 7 is a view similar to FIG. 6 with parts broken away.

As illustrated in the triangulation diagram of FIG. 5, B represents the base of a right angled triangle which is horizontal or parallel to the surface level of the water W. The vertical side is represented by H and the hypotenuse by the letter L while A represents the angle of L to B. It is well known that through mensuration the length of H may be found if the length of L and its angle A to the base B is also known.

In accordance with the invention therefore a marked or measured fishing line 11 may be used, and for illustration purposes let us use one that is marked by having a different colored full section every thirty feet. With ten different colored sections we would then have a total line length of three hundred feet. We now have the capability of knowing the length of L of FIG. 5 by watching the color of the line let out. The juncture of any two colors representing the end of one section of thirty feet and the beginning of another. Angle A and the height H are the unknowns and the invention proposes to use the angle A to provide the unknown dimension H. To accomplish this, the embodiment shown in FIGS. 1 to 5 is made in the form of a hinged pair of card-like parts or members 15. A line part or member 20 provided with line attaching means 16 is adapted to assume the angle A of the line 11 when mounted thereon, while a plumb part or member 21 freely hinged at 30 to the line member 20 will assume by the pull of gravity a level position parallel to the water level and base line B. Since we now have the line member 20 at the angle of the line 11 and the plumb member 21 parallel to the base line B, through the means of a graduated dial on one and a pointer on the other we can now determine the angle A in degrees. Through the integration of this information, the angle A and the length of line L, the height H can now be computed. However the invention proposes to eliminate the bother of computation and provides direct reading information, for example, in this instance, on the face of the line card 20.

The line attaching means 16 as shown in FIG. 1 may comprise openings 22 provided with a narrow slot 23 extending toward the left and right edge of the line member 20 for access of the line 11 into the openings 22. The slots 23 and openings 22 are provided in such a way as to form the tabs 19 which retain the line in the openings 22 after entry therein.

To prevent loss of the indicating device 15 while in use, a tie 25 is fastened at one end to the line member 20 through an eyelet and knot 24 while its other end is fastened to a snap 26 which may be clipped onto the tip guide 27 of a fishing rod tip 12. This line may be let out or reeled in to suit conditions, to raise or lower the fishing bait, or other article 14.

On its face the line card 20 may have, for example, printed thereon a group of colored column 11a yellow, 11b green, 11c orange, 11d purple, 11e blue, 11f brown, 11g gray, 11h red, 11i white and 11j black, which lay in the path or under the trolling line 11 for visual matching of one to the other. These columns 11a–11j project downward on the card 20 toward the pivot 30 into a calibrated area including a pair of arcuate windows 35 and 36 which may be openings or transparencies in the card 20. Through these windows 35 and 36 a pair of pointers 31 and 32 imprinted on the plumb card 21 show to indicate the depth of a lure at that instant.

The columns 11a–11j are colored in the same sequence as those colored sections of the trolling line 11, being used, and for the users' convenience the line length out may be indicated in feet at each column as indicated at 30, 60, 90, 120, 150, 180, 210, 240, 270 and 300, each colored section being in this example thirty feet in length. Also the columns 11a–11j are intersected by a number of horizontal lines 38, these lines 38 forming boxes 40 in which computed depths in feet may be printed.

Each box 40 of the columns 11a and 11j have at their left and right side an arrow leading to a line 41 which leads over to and becomes a division mark on a dial 42 or 43, printed along the inside edge of the arcuate windows 35 and 36.

Spaces between the division marking lines 41 are shown as being subdivided into three spaces in this instance, each representing one-third of the lowermost figure in a column. For example, if the figure being read in the row above the zeros is 3, one-third would be one, if the figure being read is 30, one-third would be ten, etc., also in each box above the same would be true. Further taking the top two boxes, column 11a, 18 reading up plus the next space is nineteen, plus the next space is twenty, plus the next space is 21. In column 11j, 180 reading up plus the next space is one hundred ninety, plus the next space is two hundred and plus the next space is two hundred ten.

All depths within the range of the device 15 are computed and printed in their proper boxes 40, there being eighty boxes shown in the illustration of FIG. 1. With simple calculation of division by one-third, as just explained above, this number of depths may be increased to three times or two hundred forty depths when the one-third divisions of the dials 42, 43 are used.

The plumb card 21 may have besides the pointers 31 and 32 instructions for use printed on its face. Advertising or other useful information, such as a fishing calendar, information of the tides, etc. could advantageously be printed on the back faces of the line card member 20 and the plumb card 21.

Operation

For simple illustration as shown in FIG. 1, let us assume that a fishing line is being used and that this line and depth indicator were made to be used together, i.e. the colored length of the line and their sequence match the indicator. The lure 14 and line 11 are out being trolled behind the boat at a certain boat speed, the indicator 15 has been hooked onto the line 11 so that the line 11 lays behind the tabs 19 and in front of the colored bands 11a–11j on the front face of the line card 20, and the tie 25 and snap 26 in the eye 27 will prevent loss of the indicator. Let us further assume that line has been let out to the blue section matching the color band 11e. The indicator pointer 31 through the window 35 is pointing to the lead line 41 to the horizontal column of boxes 40 reading 6 in the 11a color band, 12 in the 11b color band, 18 in the 11c band, 24 in the 11d band and 30 in the 11e band, the color of which matches the blue section of line 11 laying over the 11e band. 30 in box 40, band 11e, represents a depth of thirty feet but this is only approximate since we do not know how much of the blue section of line 11 is out. If we let more line 11 out until the junction of the blue colored section with the next colored section shows, which is brown, we would know that we have exactly one hundred fifty feet of line out, since we can read 150 on the blue colored band 11e just below the line 11. We would also know that the numeral 30 in the box 40 of the color band 11e would be a depth of exactly thirty feet minus the height of the indicator 15 above the level of the water. Let us say that the indicator is two feet above the water, thus giving us a depth of exactly twenty-eight feet that the lure 14 is below the surface of the water. If the operator wanted a depth of say forty-three feet he could arrive at this depth by leaving the line length out remain the same as just explained, i.e. 150 feet, and by slowing down the trolling speed increase the downward slope of the line so that the pointer 31 would point to the line 41 going to the horizontal column of boxes 40 showing the numerals 9, 18, 27, 36, and 45 of the color band 11e. The indicator 15 being two feet above the water, two feet subtracted from the numeral 45, giving forty-three, the lure depth desired. This could also be accomplished in another way, i.e. by maintaining the same trolling speed as in the first instance, but letting out a greater length of line. For example, if as shown in FIG. 1, we see pointer 31 pointing to the line 41 leading to the horizontal column of boxes 40, showing the numerals 6, 12, 18, 24, 30, 36 and 42 of the color band 11g, which is the gray color. It is only necessary to let line out until we come to the end of the gray colored section, and if we read down the gray band to the box 40 indicated, we would read 42. With subtraction of the two foot height of the indicator 15 above the water level, we arrive at an exact lure depth of forty feet, this being three feet short of the forty-three foot depth desired. It now follows that if we let out about one-sixth of our next red colored section of line (exactly five feet of red line) or until pointer 31 reads one-half space to the next small division line of the smaller one-third divisions, the lure would descend three and one-half more feet to a depth of forty-three and one-half feet exactly, one-half foot more than we wanted but close enough for all practical purposes.

The examples given are just a few of the ways in which the indicator 15 may be utilized. It should be noted that the indicator 15 can be used with the line sloping down either to the left or the right and still automatically give correct readings. That is to say, it is neither right nor left hand, and this feat is accomplished by the use of dual pointers 31 and 32 placed on opposite sides of the pivotal hinge point 30 combined with dual windows 35 and 36 and dual dials 42 and 43. As will be observed, only one pointer shows through one window at a time except when the line is level and the pointers 31 and 32 point at zero. At all other times only one pointer will show, as is shown in FIG. 1, pointer 31 shows through window 35 while pointer 32 is beyond the range of the window 36. The reverse of this is also true.

While thirty foot colored sections of line 11 are illustrated in the above illustration and descriptions, other lengths, longer or shorter, of colored sections may be utilized. In fact, other identifying or keying means may be used, such as one spot of paint or dye, indicating the end of a first section of line, the next, two spots indicating the end of a second section while the indicator bands 11a–11j would be similarly marked with one spot, two spots, etc.

As illustrated in FIG. 4, the line card 20 has been swung about the pivotal hinge 30 so that it lays opposite the plumb card 21 and takes no more space than a single card. The tie cord 25 and snap 26 may then be wound about the two cards 20, 21 to hold them in compact position for easy insertion into the users' pocket.

A modified construction is shown in FIGS. 6 and 7 wherein the movable swinging or plumb member 50 is pivoted on an eyelet 51 between a pair of line part members 52 and 53, the eyelet 51 forming a connection between the three parts 50, 52 and 53. Other fastening means in the form of eyelets 54 and spacers 55 may be provided at the four corners to properly fasten together the line members 52 and 53 and also properly space them for free swinging of the plumb member 50 therebetween. Hooks 56, one at each upper corner, may also be held by the eyelets 54 for attachment of the indicator 58 to a fishing line 11, in the same manner as the first form of the invention.

In this construction the line part members 52, 53 may be identical so that the indicator 58 may be used from either face or, as illustrated in FIGS. 6 and 7, the member 52 has a window 60 through which the depth readings are taken. The plumb part member 50 is in the form of a quarter segment of a circle and always hangs plumb by the force of gravity so that the ten zeros, 0's, are always in a vertical column one above the other, in a radial line from the pivot eyelet 51. Other numerals like 3, 6, 9, 12, 15, 18, 21, 24, 27 and 30 are placed in other radial columns from the eyelet 51 and on either side of the first mentioned radial columns of 0's. Other succeeding radial columns of numerals, starting at the top with the numerals 6, 9, 12, 15, 18 and 21 and on either side of the central column of 0's, are also placed on the plumb part 50. The angular, radial spacing of all of these numerical columns are of such an angle that all of the computed numerals just mentioned when read through the window 60, with the line card suspended on a line at some angle near the horizontal, will give the correct depth readings. These numeral columns on either side of the 0's make the indicator 58 usable in either a left or right-hand position, and make the readings automatically show properly.

The face of the card member 52 has printed thereon bands of color 61a, 61b, 61c, 61d, 61e, 61f, 61g, 61h, 61i and 61j, which have their upper portion located where the line 11 will lay when the device 58 is positioned on a line in use. The color bands then curve toward the right to the window 60 and then beyond in the form of arrows 65 which point to line length figures in feet 30, 60, 90, 120, 150, 180, 210, 240, 270 and 300, as shown in FIG. 6.

In this form of the invention the device 58 is hung on a fishing or other use line having the proper matching colors of the color bands 61a-61j, by means of the line hooks 56. Tying means 25, 26, like that shown in FIG. 1 may also be used with this depth indicator 58 to prevent its loss. When the card members 52 and 53 assume the angle of the line 11, the window 60 will swing to the left or right, depending upon the angle of the line while the plumb part member 50 will stay plumb by gravity. Thus different figures, depending upon the line 11 angle will show through the window 60. As before explained in the first form of the invention, the color of the line is matched to the color band of the same color it is laying on and that band is then followed to the window 60 where the correct depth reading is given. Beyond the window 60 the arrow portion of that color band will indicate the length of the line that is out.

The modified form of the invention just described has the advantage of a single row of figures showing at one time through the window 60 and is compact and self-contained and simple to use.

The device and its modifications when used with a proper matching line provides in direct continuous reading form, translation of the degrees of the angles involved into usable depths in feet. When used in conjunction with depth charts of the waterways being trolled the fisherman by simple subtraction of his depth indicator figures from the depth figure given by the waterway chart can tell how much his lure is above the bottom being trolled.

As before indicated, uses other than that just explained might be in kite flying, or model airplanes, since the invention indicates height or depth. For this use, the marked line 11 would be connected to any kite or airplane and the indicator 15 or 58 would be applied to the line and used to read height.

The terms and expressions which have been employed are used as terms of description and not of limitation and there is no intention in the use of such terms and expressions, of excluding any equivalents of the features shown and described, or portions thereof, it being recognized that various modifications are possible within the scope of the invention claimed.

I claim:
1. A water depth indicator useful with a fishing line of the type having different colors in successive stretches thereof that are indicative of measured lengths from a free end of the line, which comprises, a line member having means adjacent an edge thereof by which it may be detachably coupled to said line, and have the same inclination as the line, when said line is fed out and extends into the water, with the line crossing a face of said member, and also carrying a succession of different colored areas on said face thereof adjacent to and progressing along said line, and which are the same colors used on said line, said member having defined areas each alined with and relative to one of said color areas, and each such area carrying a row of notations of precalculated depth values that correspond to the vertical distances for different inclinations of said line, between the free end of said line which is out and the stretches of the line having the color stretch corresponding to the color of the defined area related to that row of notations, a plumb element pivotally connected in unbalanced condition to said member and continuously urged by gravity to depend vertically from its said pivotal connection to said member for all inclinations of said line to which it may be coupled, and said element having means cooperating with said member for focusing attention upon a particular one of said notations in each row depending upon the inclinations of said line at any time to which said member is coupled, whereby by observing the particular notation upon which attention is focused in the color area on said member that corresponds to the color of the line where the member is attached, the depth of submergence of the free end of the line will be directly indicated.

2. A water depth indicator useful with a fishing line of the type having different colors in successive stretches thereof that are indicative of measured lengths from a free end of the line, which comprises, a line member having means adjacent an edge thereof by which it may be detachably coupled to said line, and have the same inclination as the line, when said line is fed out and extends into the water, with the line crossing a face of said member, and also carrying a succession of different colored areas on said face thereof adjacent to and progressing along said line, and which are the same colors used on said line, said member having defined areas each related to one of said colored areas, a plumb element pivotally connected eccentrically to said member and continuously urged by gravity to depend vertically from its said pivotal connection to said member for all inclinations of said line to which it may be coupled, one of said member and said element having a plurality of rows of notations of precalculated depth values that in each row correspond to the vertical distances, for different inclinations of said line, when said member is attached to the line between the free end of said line which is out and that stretch of the line having a color corresponding to the color of one of the defined areas, the other of said member and said element having means for directing attention to that one of said depth notations in any of said rows of notations related to the color of that defined area which corresponds to the color of that stretch of the line to which said member is attached at that time, and whereby the notation to which attention is so directed indicates directly the depth of submergence of the free end of the line at that time.

3. A water depth indicator useful with a fishing line of the type having different colors in successive stretches thereof that are indicative of measured lengths from free end of the line, which comprises a line member having means adjacent an edge thereof by which it may be detachably coupled to said line, and have the same inclination as the line, when said line is fed out and extends into the water, with the line crossing a face of said member, and also carrying a succession of different colored areas on said face thereof adjacent to and progressing along said line, and which are the same colors used on said line, said member having defined areas each related to one of said colored areas, a plumb element pivotally connected eccentrically to said member and continuously urged by gravity to depend vertically from its said pivotal connection to said member for all inclinations of said line to which it may be coupled, said element having a separate row of notations of pre-calculated depth values that correspond to the vertical distances, for different inclinations of said line when said member is attached to said line, between the free end of said line which is out and that stretch of the line having a color corresponding to the color of one of the defined areas, said member having a window in front of said element through which the rows of notations on said element successively appear as said member is changed in inclination.

said notations in each row being arranged in the same order as the colors of said defined areas and said defined colored areas extending from adjacent the area crossed by said lines into proximity to said window.

4. The indicator according to claim 2, wherein said attention directing means is a mark on said other of said member and said element, and said one of said member and said element which carries said rows of notations has an arcuate window, with a center of curvature approximately at said pivotal connection of said element to said member, through which said mark is visible.

References Cited by the Examiner

UNITED STATES PATENTS

| 751,623 | 2/1904 | Farr | 33—126.5 |
| 1,166,019 | 12/1915 | Taylor et al. | 33—207.2 |

FOREIGN PATENTS

| 164,753 | 5/1949 | Austria. |
| 172,833 | 12/1921 | Great Britain. |

ISAAC LISANN, *Primary Examiner.*